(12) United States Patent
Kasuga et al.

(10) Patent No.: US 6,577,924 B1
(45) Date of Patent: Jun. 10, 2003

(54) ROBOT MANAGING SYSTEM, ROBOT MANAGING METHOD, AND INFORMATION MANAGING DEVICE

(75) Inventors: Tomoaki Kasuga, Chiba (JP); Ayako Okita, Tokyo (JP); Tsunetaro Matsuoka, Tokyo (JP); Tetsuya Konishi, Tokyo (JP); Tadashi Otsuki, Kanagawa (JP); Kunio Takemoto, Tokyo (JP); Yaeko Fujita, Tokyo (JP); Toshiya Ogura, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/958,363
(22) PCT Filed: Feb. 9, 2001
(86) PCT No.: PCT/JP01/00953
§ 371 (c)(1), (2), (4) Date: Feb. 19, 2002
(87) PCT Pub. No.: WO01/58650
PCT Pub. Date: Aug. 16, 2001

(30) Foreign Application Priority Data

Feb. 9, 2000 (JP) ........................................ 2000-038131

(51) Int. Cl.[7] .............................................. G06F 19/00
(52) U.S. Cl. ..................... 700/245; 700/246; 700/253; 700/257; 700/264; 340/7.2; 340/7.21; 340/7.29; 702/56; 379/49; 901/31; 901/37
(58) Field of Search ................................ 700/245, 246, 700/253, 257, 264, 213, 218, 228, 229; 340/7.2, 3.1, 7.21, 7.29, 870.28, 870.11, 683; 702/56, 188; 901/31, 37; 235/379, 375; 399/8, 9; 379/49, 91.02

(56) References Cited

U.S. PATENT DOCUMENTS 5,615,296 A * 3/1997 Stanford et al. ......... 704/270.1
5,836,771 A * 11/1998 Ho et al. .................... 434/362
5,934,910 A * 8/1999 Ho et al. .................... 434/362
6,289,513 B1 * 9/2001 Bentwich .................... 717/106
6,336,029 B1 * 1/2002 Ho et al. .................... 434/362
6,480,698 B2 * 11/2002 Ho et al. .................... 434/362
6,501,937 B1 * 12/2002 Ho et al. .................... 434/362
2002/0018984 A1 * 2/2002 Ho et al. .................... 434/362

FOREIGN PATENT DOCUMENTS

| EP | 0 898 237 A2 | 2/1999 |
|----|---|---|
| JP | 6-110540 | 4/1994 |
| JP | 10-49221 | 2/1998 |
| JP | 10-154181 | 6/1998 |
| JP | 11-24744 | 1/1999 |

OTHER PUBLICATIONS

Moss, Real–time Control on Ethernet Real–time Control on Ethernet, 2002, Internet, pp. 53–60.*

* cited by examiner

Primary Examiner—William A Cuchlinski, Jr.
Assistant Examiner—McDieunel Marc
(74) Attorney, Agent, or Firm—Frommer Lawrence & Haug LLP; William S. Frommer

(57) ABSTRACT

A robot-related information held at a robot user ad data held at a robot manufacturer as well as to enhance the user's sense of attachment to the robot. Each of personal terminal devices (31A to 31D) has both a function to send information on a robot 1 to a telecommunication line (39) and a function to receive answer information sent from a server (38) to the robot user via the telecommunication line, and the server (38) generates answer information on the basis of robot-related information sent from the personal terminal devices (31A to 31D) via the telecommunication line and reference information previously stored in an information storage device and corresponding to the robot-related information and sends the answer information to the personal terminal devices (31A to 31D) via the telecommunication line. The answer information is a diagnostic report on the robot.

24 Claims, 13 Drawing Sheets

REQUEST OF SERVICE

51a · DIAGNOSIS ☐

51b · GREETING CARD ☐

51c · REPAIR ☑

51d · CHARACTER CORRECTION ☐

USER ID  [      ]

51e

PASSWORD  [      ]

51f

BILLING METHOD   VISA

NODE₁₀₀

NODE₁₂₀

| TRANSITION DESTINATION NODE | INPUT EVENT NAME | DATA NAME | DATA RANGE | PROBABILITY OF TRANSITION TO OTHER NODE (Di) | | | | NODE 600 |
|---|---|---|---|---|---|---|---|---|
| | | | | NODE 120 | NODE 120 | NODE 1000 | | |
| OUTPUT ACTION | | | | ACTION 1 | ACTION 2 | MOVE BACK | | ACTION 4 |
| 1 | BALL | SIZE | 0, 1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0, 100 | | | | | |
| 6 | | JOY | 50, 100 | | | 50% | | |
| 7 | | SURPRISE | 50, 100 | | | 100% | | |
| 8 | | SADNESS | 50, 100 | | | | | |

ROBOT MANAGING SYSTEM, ROBOT MANAGING METHOD, AND INFORMATION MANAGING DEVICE

TECHNICAL FIELD

The present invention relates to a robotic device management system and method, and an information management apparatus, intended to manage an autonomous type robot which acts autonomously.

BACKGROUND ART

Recently, there have been proposed robotic devices each capable of autonomously deciding its own behavior correspondingly to its surrounding environment and internal state. Such robots include for example a type which can have a pseudo-emotion and -instinct (will be referred to as "emotion" and "instinct" hereunder) which are changed according to its environment and internal state, and behave correspondingly to such changes in emotion and instinct, that is, can reflect changes of its emotion and instinct in its action.

A robotic device is produced by a robotic device manufacturer, and sold to a user. Therefore, information on the robotic device is reserved at the manufacturer side. For example, the information stored at the robotic device manufacturer includes a program etc. by which an action of the robotic device is decided according to a state such as an emotion as in the above.

Therefore, if the data stored at the manufacturer can effectively be utilized, it will have a higher value as a useful information resource. Also, if the data reserved at the manufacturer side can be served to the user for linkage or correlation with data reserved at the user side, it will be more useful. Service to the user of the information thus correlated with the data reserved at the user side will enhance the sense of attachment to his or her robot.

DISCLOSURE OF THE INVENTION

Accordingly, the present invention has an object to overcome the above-mentioned drawbacks of the prior art by providing a robotic device management system and method and an information management apparatus, capable of an effective utilization of information on a robotic device, reserved at a user of the robotic device, and data reserved at the manufacturer of the robotic device and also enhancing the user's sense of attachment to his robotic device.

The above object can be attained by providing a robotic device management system including:

a transmitter to send, to a telecommunication line, information on an autonomous type robotic device which acts autonomously according to an external factor and/or internal factor;

an answer generator to generate answer information based on the robotic device-related information sent from the transmitter via the telecommunication line and reference information previously stored in an information storage means and corresponding to the robotic device-related information and send the answer information to a user of the robotic device via the telecommunication line; and a receiver to receive the answer information sent from the answer generator to the robotic device user via the telecommunication line.

In the robotic device management system constructed as in the above, the information on the autonomous type robotic device which acts autonomously according to an external factor and/or internal factor is sent from the transmitter to the telecommunication line, the answer information is generated by the answer generator based on the robotic device-related information sent from the transmitter via the telecommunication line and reference information previously stored in the information storage means and corresponding to the robotic device-related information, and it is sent from the answer generator to the robotic device user via the telecommunication line, and the answer information sent from the answer generator via the telecommunication line to the robotic device user is received by the receiver.

Thus, the robotic device user can know the state of his or her robotic device from the answer information.

Also, the above object can be attained by providing a robotic device management method including steps of:

sending, to a telecommunication line, information on an autonomous type robotic device which acts autonomously according to an external factor and/or internal factor;

preparing answer information based on the robotic device-related information sent in the sending step via the telecommunication line and reference information previously stored in an information storage means and corresponding to the robotic device-related information and sending the answer information to a user of the robotic device via the telecommunication line; and receiving the answer information sent in the answer preparing step to the robotic device user via the telecommunication line.

The above robotic device management method permits the robotic device user to know the state of his or her robotic device from the answer information.

Also, the above object can be attained by providing an information management apparatus including:

means for communicating, via a telecommunication line, with a user of an autonomous type robotic device which acts autonomously according to an external factor and/or internal factor; and means for receiving information on the robotic device via the communicating means, preparing answer information based on the robotic device-related information and reference information previously stored in an information storage means and corresponding to the robotic device-related information, and sending the answer information to the robotic device user via the telecommunication line.

The information management apparatus constructed as in the above receives, by means of the answer generating means via the communicating means, the robotic device-related information sent from the user of the autonomous type robotic device which acts autonomously according to an external factor and/or internal factor the answer generating means receives, generates, by the answer generating means, answer information based on the robotic device-related information and reference information previously stored in the information storage means and corresponding to the robotic device-related information, and sends, from the answer generating means, the answer information to the robotic device user.

This information management apparatus permits the robotic device user to know the state of his robotic device from the answer information.

Also, the above object can be attained by providing a robotic device management method including steps of:

sending, by a user of an autonomous type robotic device which acts autonomously according to an external factor and/or internal factor, information on the robotic device, and receiving, by means of an information management apparatus, the robotic device-related information sent from the robotic device user;

managing the robotic device by the information management apparatus based on the robotic device-related information received in the receiving step; and sending, by means of the information management apparatus, information on the slate of the robotic device, generated in the managing step to The robotic device user.

The above robotic device management method permits the robotic device user to know the state of his robotic device from the answer information.

BRIEF DESCRIPTION OF THE DRAWINGS

FIG. 7 shows a screen display for application of a request for service.

FIG. 8 shows a screen display for authentication of the user when a request is applied for service.

FIG. 16 conceptually shows a state transition table.

BEST MODE FOR CARRYING OUT THE INVENTION

The present invention will be further discussed below concerning an embodiment thereof with reference to the accompanying drawings. The embodiment is a robotic device management system for a robotic device as shown in FIG. 1.

Figure 1:
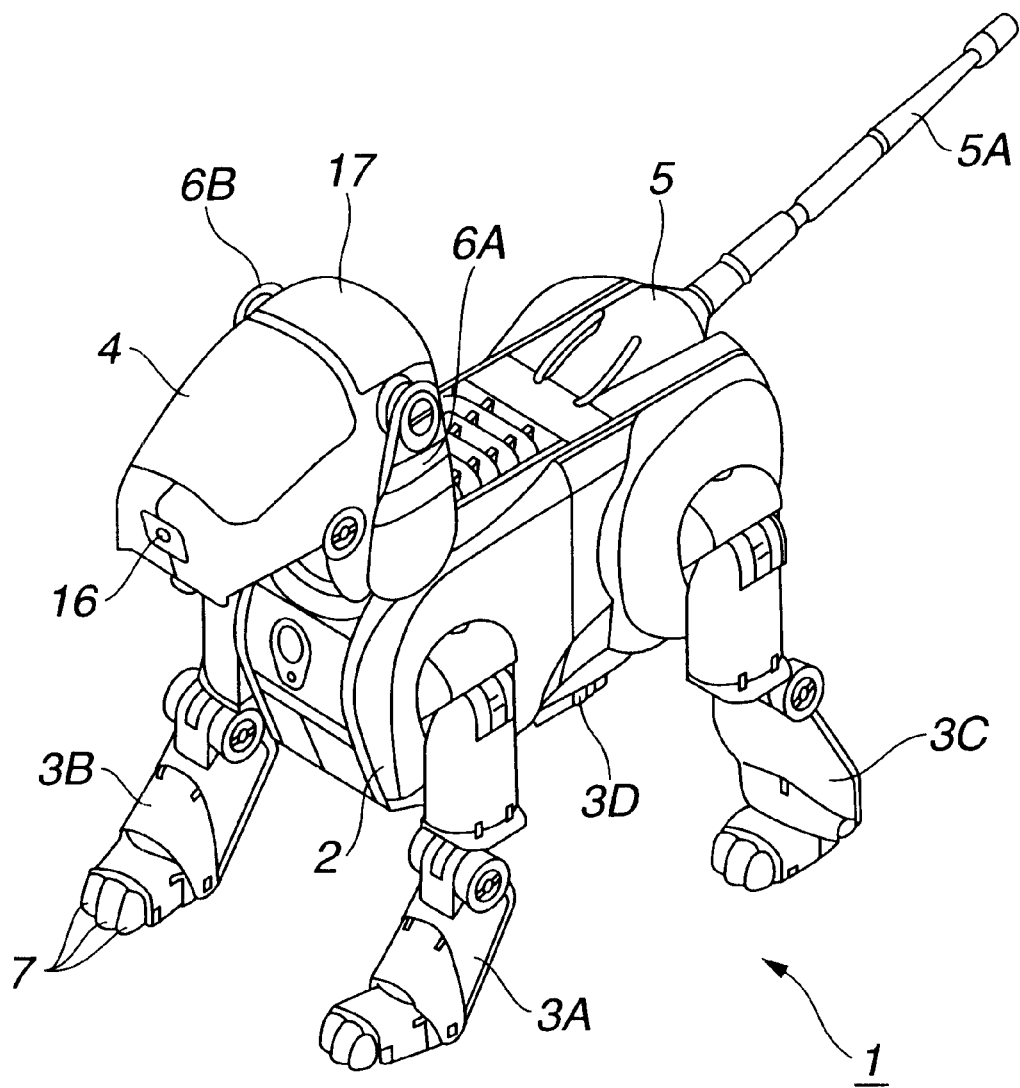
FIG. 1 is a perspective view of a robotic device managed by an embodiment of the robotic device management system according to the present invention.

In FIG. 1, the robotic device (will be referred to simply as "robot" hereunder) is generally indicated with a reference 1. The robot 1 includes a body unit 2 having leg units 3A to 3D joined at the front right and left and rear right and left thereof, and a head unit 4 and tail unit 5 joined at the front and rear ends thereof.

This robot 1 is of an autonomous type which autonomously decides its own action according to modeled information such as an emotion model and instinct model. More particularly, the emotion model and instinct model are changed in state correspondingly to the environment (external factor) and internal state (internal factor) to allow the robot to act correspondingly to the changes of the states, namely, allow the robot to express its emotion and instinct by an action. The instinct model and emotion model for the robot 1 will further be described later. The robot management system according to the present invention manages such a robot 1.

(1) Construction of the Robot Management System

Figure 2:
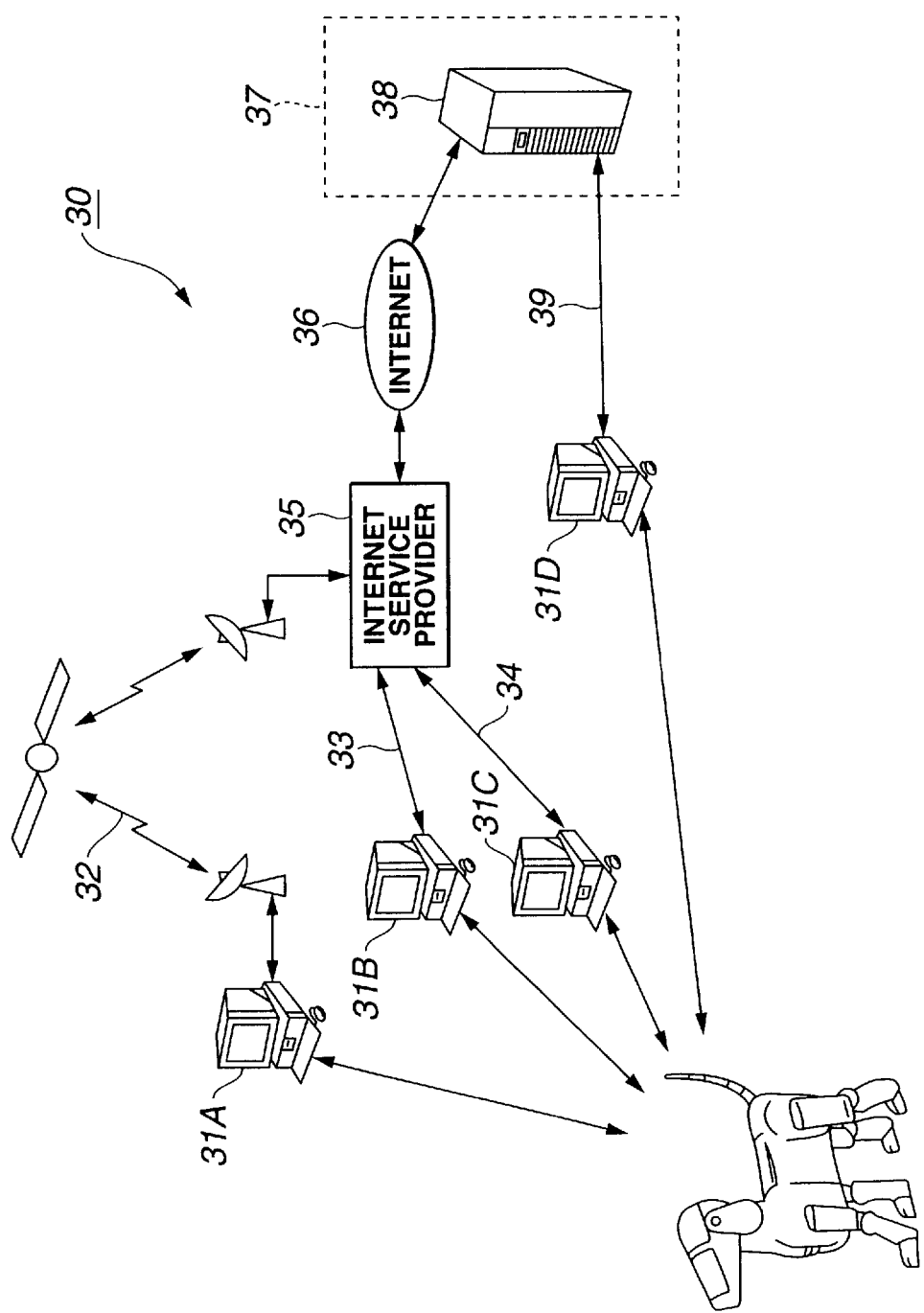
FIG. 2 is a block diagram of a network system in which the robotic device management system according to the present invention is organized.

The robot management system is constructed from a network system generally indicated with a reference 30 in FIG. 2.

The network system 30 includes personal terminal devices 31A to 31D and a registration server 38 connected to the personal terminal devices 31A to 31D by various telecommunication lines 32, 33, 34 and 39, respectively.

In the network system 30, each of the personal terminal devices 31A to 31D has both a function to send information on the robot 1 to the telecommunication line and a function to receive answer information sent from the server 38 to the user of the robot 1 via the telecommunication line, and the server 38 forms an answer generator which generates answer information on the basis of the robot-related information sent from each of the personal terminal devices 31A to 31D via the telecommunication lines 32, 33, 34 and 39 and reference information previously stored in an information storage means and corresponding to the robot-related information and sends the answer information to the personal terminal devices 31A to 31D of the robot user via the telecommunication lines. The network system 30 will further be illustrated and described in the following.

In this network system 30, the personal terminal devices 31A to 31C are connected to an Internet service provider 35 by a satellite communication line 32, cable television line 33 or telephone line 34 as shown. Also, the Internet service provider 35 is connected to the server 38 via an Internet 36, and the personal terminal device 31D is connected directly to the server 38 by the ordinary public network 39.

Each of the personal terminal devices 31A to 31D is an ordinary personal computer installed in an ordinary home, and communicates with the server 38 via the Internet 36 or the ordinary public network 39 to transmit and receive necessary data to and from the server 38 and communicates with the robot 1.

Figure 3:
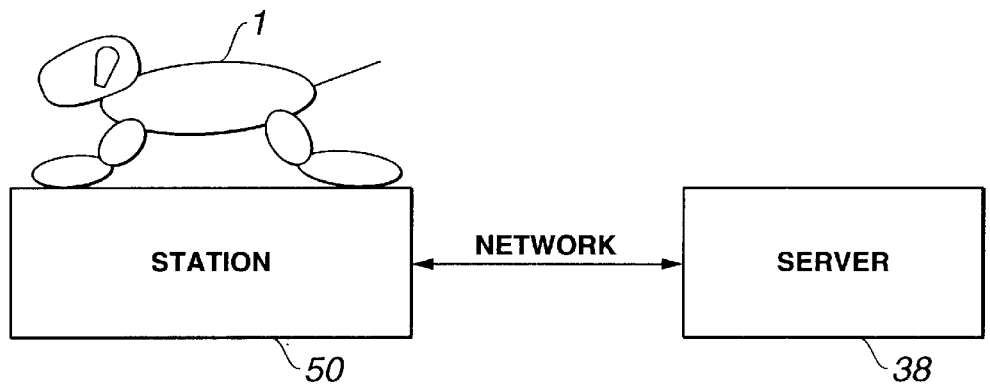
FIG. 3 shows a connection of the robotic device to a server via a station.

The robot 1 may be connected to the server 38 by a so-called station 50 as shown in FIG. 3. The station 50 incorporates a modem function, and connects with the ordinary public network 39 to send information on the robot 1 placed thereon to the server 38. Note that the station 50 may be provided with a power unit. In this case, the station 50 can send the information on the robot 1 to the server 38 while charging the battery of the robot 1.

The server 38 sends a variety of information to personal terminal devices 31A to 31D having accessed the server 38 via the Internet 36 or ordinary public network 39. It may be a Web server at a manufacturer or distributor 37 of the robot, for example.

Figure 4:
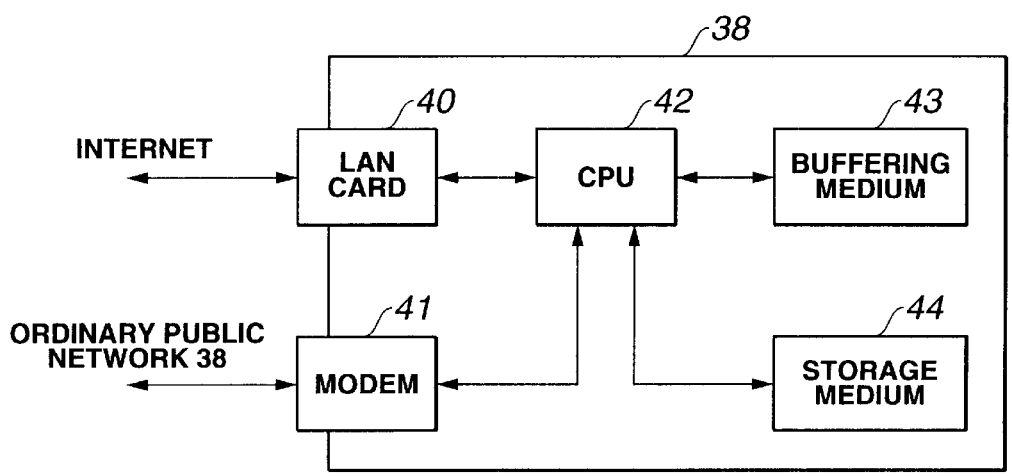
FIG. 4 is a schematic block diagram of the server.

The server 38 is constructed as shown by way of example in FIG. 4. As seen, the server 38 includes a LAN (local area network) card 40 incorporating an interface circuit via which the server 38 interfaces with the Internet 36, modem 41 via which the server 38 interfaces with the ordinary public network 39, CPU 42 which controls the entire server 38, temporary storage medium 43 formed from a semiconductor memory which serves as a work memory of the CPU 42, and a storage medium 44 such as a hard disc drive having stored therein various data which are used for the server 38 to perform processing operations as will further be described later.

In the server 38, data and command supplied from the personal terminal devices 31A to 31D having accessed the server 38 via the Internet 36 or ordinary public network 39 are taken into the CPU 42 through the LAN card 40 or modem 41, and a predetermined processing operation is performed based on the data and command and control information stored in the storage medium 44.

The CPU 42 generates on-screen data to be displayed on an appropriate screen for a result of the above processing operation as necessary, and sends it to an appropriate one of the personal terminal devices 31A to 31D through the LAN card 40 or modem 41.

Note that the server 38 is constructed as in the above but of course the present invention is not limited to such a construction.

The network system 30 is constructed as in the above. Next, a procedure effected over this network 30 will be described.

(2) Procedures Effected Over the Network System 30

The procedures effected over the network system 30 include mainly a procedure for registration of a user and a procedure for provision of actual service. The user is registered as in the following.

(2-1) User Registration Procedure

Figure 5:
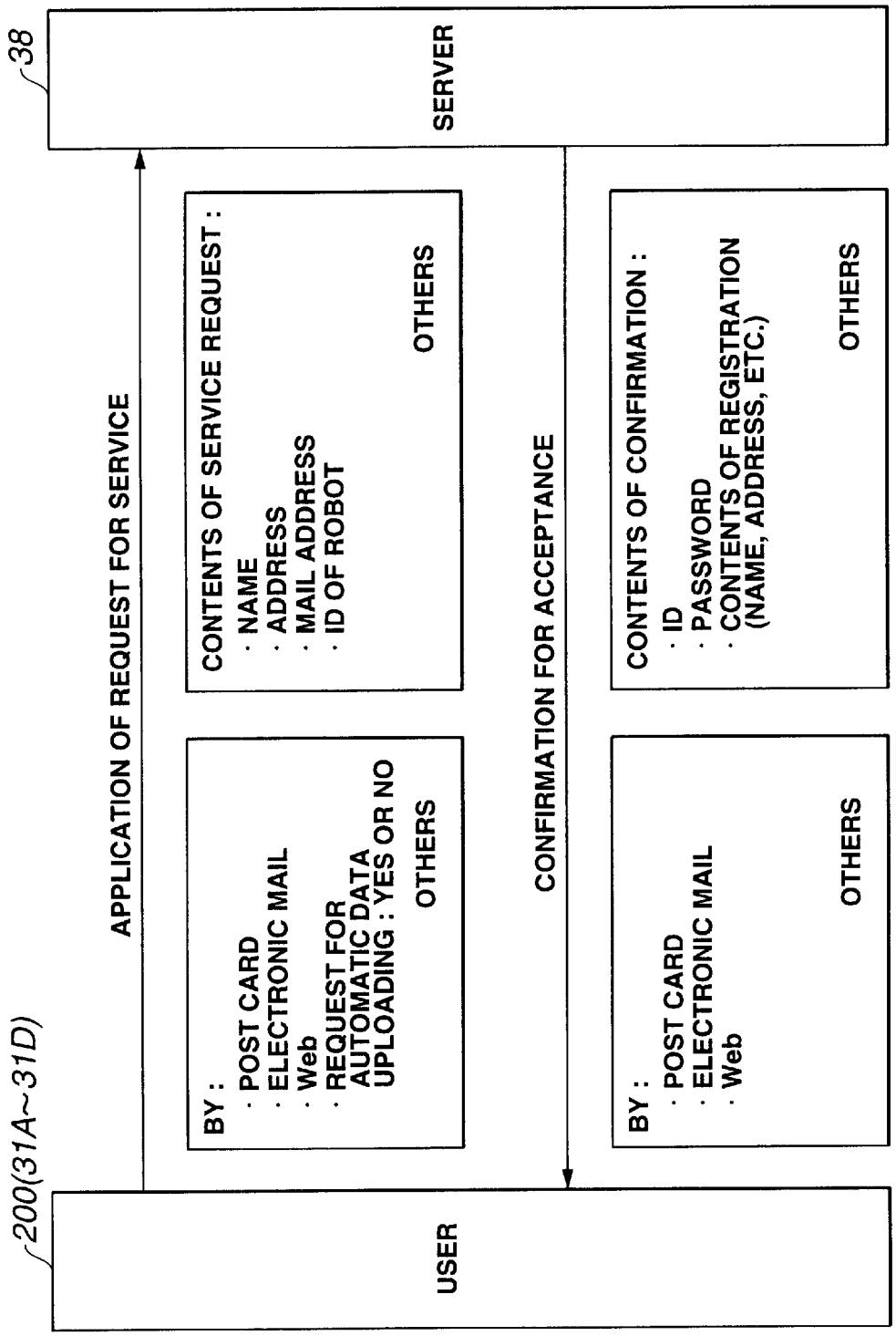
FIG. 5 is a block diagram explaining a procedure of user registration made between the user and server.

As shown in FIG. 5, a user (user of the robot) 200 applies a request for service to the server 38. The service request application is made by requesting means including a post card, electronic mail, Web site and automatic data uploading. Of them, the electronic mail, Web site and automatic data uploading are effected by entering at each of the personal terminal devices 31A to 31D.

Generally, the application for a request includes information required for confirmation of the user and for data distribution such as a user's name, address, e-mail address, ID of the robot and the like.

The server (at the robot manufacturer) 38 operates for such a request application procedure. For example, the server 38 will register a user having applied a request for service. More specifically, the server 38 will register an ID of the robot owned by the user and information on the user in combination.

After completion of the registration, the server 38 sends acceptance confirmation information that the user has been registered to the user 200 by means of a post card, electronic mail (will be referred to as "e-mail" hereunder wherever appropriate), Web site, etc. For example, when the acceptance confirmation information is send by the Web site, the robot user 200 accesses the Web site for making a confirmation procedure. Also, the acceptance confirmation information contains information required for subsequent service such as a user ID, password and registered data (user's name, address, etc.) for example.

With this procedure for registration of the user, the user is registered as the robot user in the server 38, and can subsequently be provided as a so-called registered user with various services as to his robot.

(2-2) Requesting Procedure for a Service

Figure 6:
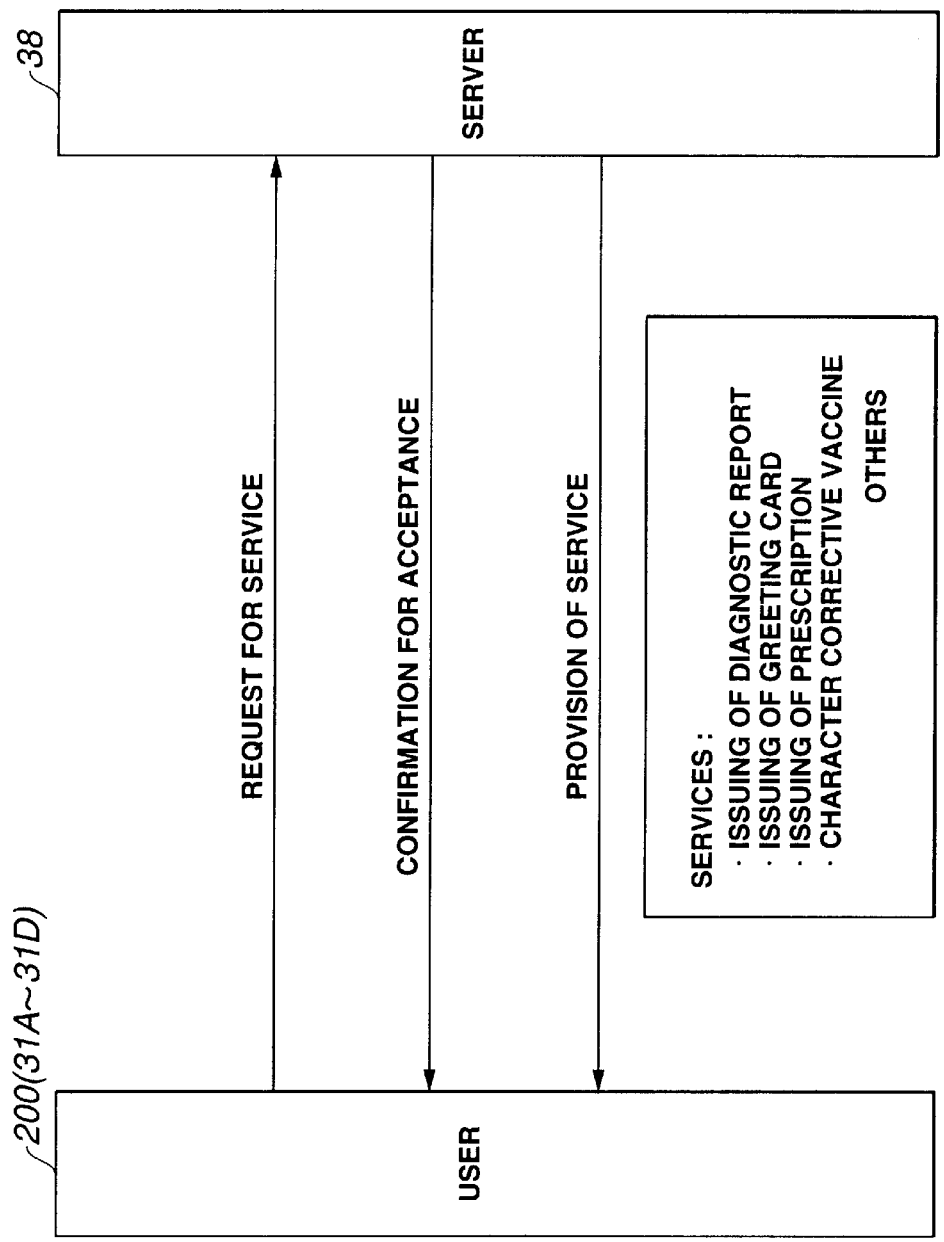
FIG. 6 is a block diagram explaining a service request from the user to the server and provision of the service from the server to the user.

As shown in FIG. 6, the user 200 uses the personal terminal devices 31A to 31D to apply a request for a service. To make a procedure for the service request, the user sends contents of the service request and ID for authentication to the server 38. Also, the user makes the service request via e-mail or Web site.

Before making a request for a service via Web site, the user accesses the Web site and makes the request by checking any of services, which can be requested as to the robot, including "Diagnosis" 51a, "Greeting card" 51b, "Repair" 51c, "Character correction" 51d, etc. displayed on a screen 51 of the monitor of the personal terminal device, as shown in FIG. 7.

The "Diagnosis"0 service is to diagnose the robot. The "Greeting card" service is to send a greeting card to the robot user or to the robot itself. The "Repair" service is to repair the robot, and the "Character correction" service is to correct the character of the robot.

The user enters details of a time at, and means, by which his robot is subjected to such a service, correspondingly to the requested service.

The requesting procedure for the "Diagnosis" service is as follows. Namely, the user sends information on his desired period, treatment and means for the "Diagnosis" service to the server 38, and the server 38 will record the information.

For authentication of the user, the user enters information about "User ID" 51e, "Password" 51f and "Billing method" 51g displayed on the screen 51 as shown in FIG. 8. The person having made a request for the above service can be confirmed to be a registered used by entering a user ID and password having been acquired by the registration procedure, for the "User ID" 51e and "Password" 51f. For the "Billing method" 51g, a method of payment for a provided service is to be entered. For this item, the user selects a credit service company and enters his credit card number. Note that the billing method should be a one implemented as an ordinary method in the network.

After registering the information on the above service request, the server 38 will send back the acceptance confirmation information to the user 200 (personal terminal devices 31A to 31D) a s shown in FIG. 6.

Then, the server 38 provides a service corresponding to the content of the service request to the user 200. The service is provided according to the content, time and means having been entered by the user 200.

(3) Details of Procedure for Provision of a Service Over the Network System 30

(3-1) Connection Between the Robot and Server

The robot of a user and the server 38 are connected to each other via the network system 30.

As having been described in the above, the robot user can be provided with various services for his robot from the server 38. To request for any of the "Diagnosis", "Repair" and "Character correction" services, the information on the robot of a user should be managed by the server 38. That is, for the "Diagnosis" service, the server 38 refers to the robot state in order to diagnose the robot, and for the "Repair" service, the server 38 refers to the driven state of the robot to detect a portion which has to be repaired. For the "Character correction" service, the server 38 refers to the character state of the robot in order to generate character corrective information for the robot.

Figure 9:
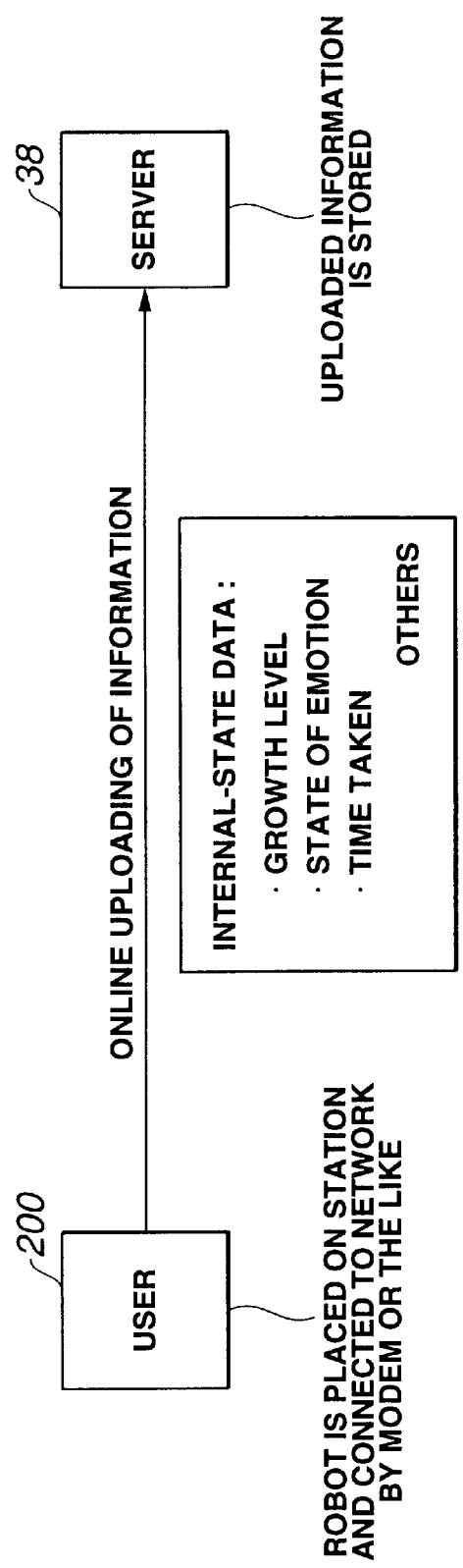
FIG. 9 explains uploading of internal informative data from the robotic device to the server.

Thus, the robot and server 38 are connected to each other in the network as shown in FIG. 9. The server 38 collects information on the robot and stores the robot information therein, and will provide various services as in the above on the basis of the robot information stored therein.

The robot and server 38 are connected to each other via the personal terminal devices 31A to 31D as shown in FIG. 2, or via the station 50 connected to the network as shown in FIG. 3.

The information online uploaded to the server 38 via the personal terminal devices 31A to 31D and station 50 is informative data on the internal state of the robot, such as growth level, character, cumulative time of use, etc. of the robot.

The server 38 stores the uploaded information, and generates information (answer information) for a requested service based on such stored information (robot-related information). More particularly, the server 38 generates answer information on the basis of the robot-related information and reference information previously stored in an information storage means and corresponding to the robot-related information. Then the server 38 sends back the answer information to he user 200. The reference information refers herein to information on the robot when shipped from factory, for example.

Thus, the server 38 collects data on the internal state of the robot via the personal terminal devices 31A to 31D and station 50, and will provide a requested service based on the informative data on the internal state of the robot.

The server 38 may collect the information on the internal state of the robot periodically or in response to each request for such a service. For example, in case the server 38 collects such information periodically, it generates answer information and so on based on latest internal-state information collected periodically and stored as updated in the information storage means in response to each request for a service, and provides the requested service.

The preparation of answer information by the sever 38 and operation effected in the robot (user) correspondingly to the answer information sent from the server 38, will further be described below.

(3-2) Diagnostic Service

As having been described above with reference to FIG. 7, the user 200 operates the personal terminal devices 31A to 31D to check the "Diagnosis" 51a on the screen 51 and make a request to a "Diagnosis". Then, the user 200 will inform the server 38 of his desired diagnostic options in the "Diagnosis".

Based on the internal-state data and reference information, the server 38 will generate a diagnostic report indicative of a result of diagnosis as the answer information for the request for the "Diagnosis".

The robot incorporates, as software, an emotion object as a model indicating a modeled emotion for expressing an emotion by an action thereof, and an instinct object indicating a modeled instinct for expressing an instinct by an action thereof, which will further be described later. Such an emotion object and instinct object are changed under the influence of external and internal factors, and the robot decides an action thereof correspondingly to the changes of the objects to express its irritable or gentle character by an action thereof.

Also, the robot includes, as software, a growth object which decides an action correspondingly to each growth level. Owing to this growth object, the robot expresses a growth level by an action thereof.

Figure 10:
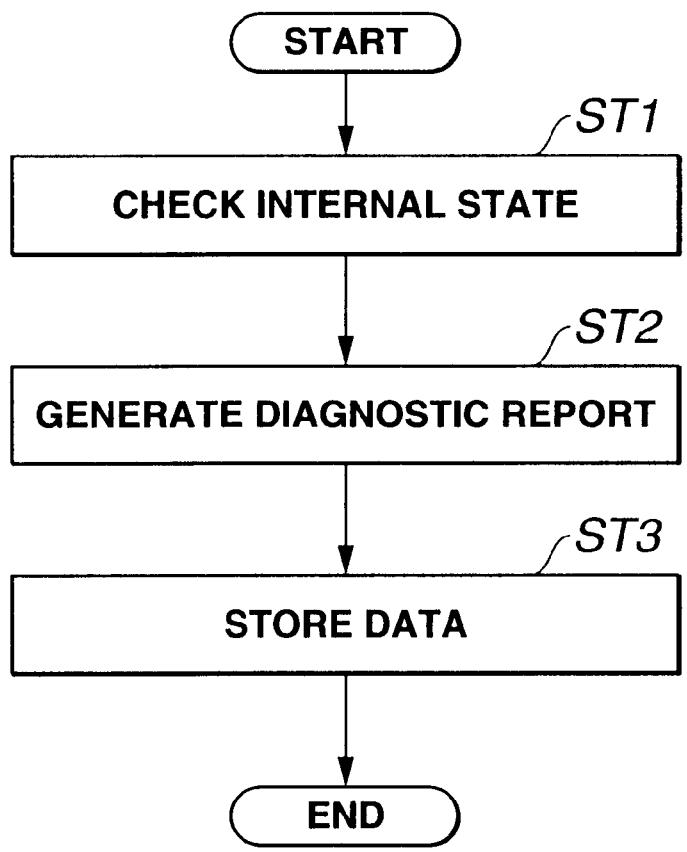
FIG. 10 is a flow chart of operations effected in a procedure for preparation of a diagnostic report at the server.

As in the above, the server 38 collects internal-state data such as robot character information (information on emotion and instinct states), growth level information and time of use (start time), etc. from the robot, and generates a diagnostic report based on the internal-state informative data and reference information. The reference information includes information on a character the robot used to have when shipped from factory. The server 38 compares the reference information with the internal-state informative data collected from the robot as in the above for generation of a diagnostic report. For generation of a diagnostic report, the internal state of the robot is checked in step ST1 as shown in FIG. 10. In next step ST2, the server 38 will generate a diagnostic report based on the result of checking the internal state of the robot. The generated diagnostic report is stored in step ST3.

Then the server 38 will send the diagnostic report by a post card, e-mail or Web site to the user 200. Thus, the user 200 can know the current character, growth level, etc. of his robot 1.

By registering information as to a desired cycle of periodic "Diagnosis" in the server 38, such "Diagnosis" can be effected periodically.

(3-3) Character Correction Service

The user 200 operates the personal terminal devices 31A to 31D to make a request for "Character correction" service as having been described in the above with reference to FIG. 7. At this time, the user 200 sends information on his desired character for example along with the request to the server 38.

Based on the character information and reference information, the server 38 prepares a character corrective vaccine as an answer information to the request for "Character correction" service. For example, the character corrective vaccine includes parameter data or software program, which will decide the robot character of the robot.

As having previously been described, the robot has the emotion and instinct objects thereof changed under the influence of an external factor and internal factor, and decides its action based on the changes of the emotion and instinct objects, thereby expressing its irritable or gentle character by an action thereof.

The server 38 collects, from the robot, internal-state information including the states of emotion and instinct objects having been changed under the influence of external and internal factors, and prepares the character corrective vaccine based on the internal-state information and reference information. The reference information includes information on a character the robot used to have when shipped from factory. The server 38 compares the reference information with the information uploaded from the robot to determine the current character of the robot, and prepares a character corrective vaccine corresponding to the current character. More specifically, the server 38 has stored therein a data base in which a difference between a character the user 200 desires and a current character of his robot is correlated with and information intended to compensate the difference. Referring to the data base, the server 38 generates or prepares information (character corrective vaccine) to correct the current character of the robot to a one the user desires.

Then, the server 38 sends the character corrective vaccine to the user 200 (robot 1) via the personal terminal devices 31A to 31D or station 50.

At the user 200, the robot 1 has the character thereof corrected with the character corrective vaccine. The user 200 having received the character corrective vaccine via the personal terminal devices 31A to 31D corrects the character of his robot 1 by administering the character corrective vaccine to update the information on the character of his robot 1. That is, in case the character corrective is effected by the user 200, the character corrective vaccine will work as a prescription for the character correction.

As in the above, for character correction of the robot 1 at the user 200, the character corrective vaccine sent to the station 50 is used to update information on the character of the robot 1. For example, the character corrective vaccine includes information intended to change the emotion object (state of the emotion) and instinct object (state of the instinct). In further detail, the vaccine includes parameter data or software program.

When the character information is updated with the character corrective vaccine, the robot 1 will have the character thereof corrected to a one the user 200 desired.

In the foregoing, there has been described a series of operations for preparation at the server 38 of the character corrective vaccine upon request for "Character correction" service from the user 200 and for correction of the character of the robot 1 with the character corrective vaccine.

The robot 1 can also have the growth level thereof improved with a similar procedure. In the robot 1, its growth state (growth level) is also changed under the influence of external and internal factors. Thus, the robot 1 will act in a manner depending upon the growth state. For this growth level improvement, the server 38 generates, as answer information, growth transition information indicative of a transition of growth based on information on the growth level uploaded from the robot 1 via the personal terminal devices 31A to 31D or station 50 and reference information. The reference information include growth level information indicative of a growth level the robot used to have when shipped from factory. The server 38 compares the reference information with the current growth level of the robot, collected from the robot as in the above, to generate the growth level transition information.

Then, the server 38 sends the growth level transition information to the user 200 (robot 1) via the personal terminal devices 31A to 31D or station 50.

The user 200 having thus received the growth level transition information sent from the server 38 will give an action instruction based on the growth level transition information to his robot 1 in order to improve the growth level of the robot 1.

(3-4) Repair Service

Figure 11:
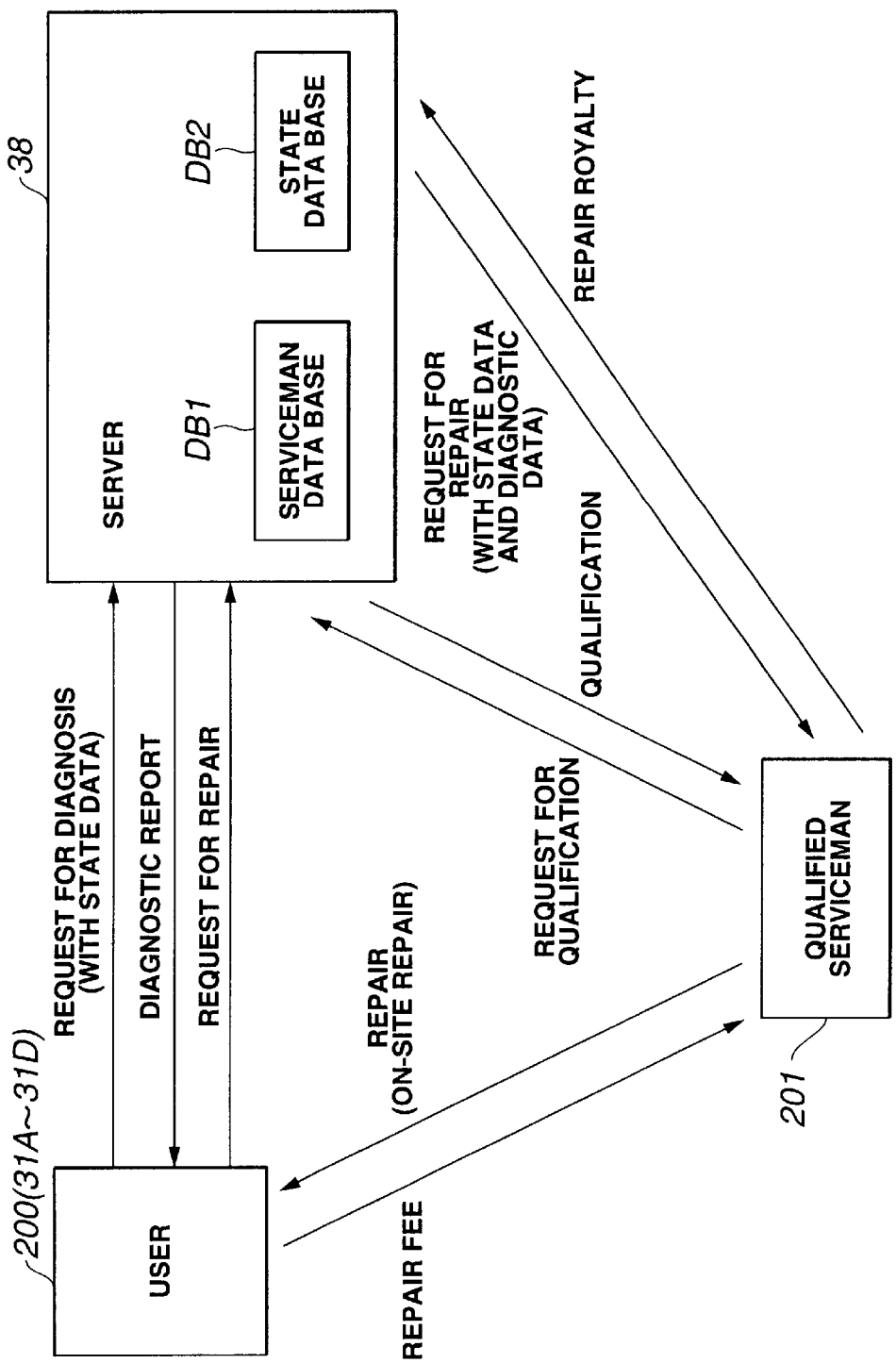
FIG. 11 is a block diagram explaining a procedure for a requested troubleshooting when a "trouble" is reported.

Operating the personal terminal devices 31A to 31D, the user 200 makes a request for diagnosis of his robot to the server 38 as shown in FIG. 11. At this time, the user 200 sends information on the faulty state and current state of the robot 1 and a desired treatment along with the diagnosis request to the server 38. The user 200 sends the state data on the robot 1 to the server 38 via the station 50 for example.

Having received the diagnosis request sent from the user 200, the server 38 will prepare a necessary diagnostic report for repair, as answer information, based on the state data sent along with the diagnosis request and reference information.

The data on the state of the robot 1 includes information on the current states of moving parts of the robot 1, for example, control information for controlling the moving parts. The server 38 has stored therein reference information intended for preparation of a diagnostic report based on such state data. Particularly, the reference information includes information on information on the state of the robot in normal operation, information on an improved (repaired) part corresponding to the state data. Such reference information is stored as a state data base DB2 in the server 38.

The server 38 will send, to the user 200, the diagnostic report prepared based on the state data and state data base DB2 as the reference information, and the user 200 having received the diagnostic report will make a request to the server 38 for repair of his robot based on the diagnostic report.

Upon request for repair, the server 38 will determine how to deal with the request for repair, and select an appropriate one of options of treatment and also an appropriate one of servicemen for the requested repair.

How to deal with the request for repair is determined by checking the current internal state, purchase date, faulty location, history of troubles, etc. of the robot in question, and an appropriate serviceman is selected based on a servicemen data base DB1 stored in the server 38. For example, a serviceman is selected with consideration to whether a serviceman has an appropriate repairing skill and how near a serviceman is to the user having made the request for repair.

Then, the server 38 will make a request to a serviceman 201 thus selected for the repair. For example, the server 38 uses e-mail or the like to send a request to the serviceman 201. At this time, the server 38 will send, to the servicemen 201, necessary data for the repair such as state data on the robot, diagnostic data (how to treat), etc. On the other hand, the server 38 informs the user 200 of data such as the serviceman's name and so forth.

The serviceman 201 having received the request for repair will visit the user 200 to make the requested repair and receive a fee for the repair. Then, the serviceman 201 will report the result of repair, and pay a repair royalty, to the server (robot manufacturer) 38.

As in the above, a requested "Repair" service is provided by the server 38 to the user 200. For example, the serviceman is registered in the servicemen data base DB1.

For example, the server (manufacturer) 38 holds a course or school for the knowledge of the structure and repair of the robots. The course is held periodically by Web site or e-mail for example.

The people having participated in the course requests the server (manufacturer) 38 for authorization of them as qualified servicemen, and the server 38 will authorize those of the people who satisfy predetermined requirements as qualified. This will be described in further detail below.

The server 38 will give points to each of the participants in such a course held periodically, and each participant will send the points gained him or her by the participation to the course to the server 38 for requesting the authorization. The server 38 will authorize the participant as a qualified serviceman based on his points sent from the participant. For example, the server 38 authorizes the course participant by holding a plurality of kinds (for skill levels) of courses and giving a number of points for each course to the participant, or by holding a course consisting of a series of lectures and giving a number of points for participation in each lecture. Thus, a serviceman can be authorized with his skill and level taken in consideration. Also, confirmation of the participation in a course is effected using data such as history of access to Web site or the like.

A serviceman thus authorized can be registered in the server 38 and, upon request, visit the robot user having requested for "Repair" service for repairing the robot of the user.

The repair may be directed for both the hardware and software. Normally, some of the robots have an action program thereof recorded in a memory card or the like. In this case, recovery of the data in the memory card may be included in a repair of the robot.

(3-5) Greeting Card Distribution Service

By operating the personal terminal devices 31A to 31D, the user 200 requests the server 38 for "Greeting card"

service. At this time, the user 200 will register, in the server 38, information including "User ID" 51h, "February 7"0 51i being a data on which the service in consideration is to be provided, "Mr. Suzuki" 51j to whom the greeting card is destined, content of the greeting cart 51k and "Send greeting card" 51m being a service the user 200 requests as shown in FIG. 12.

The server 38 sends a greeting card as answer information to the user 200 based on the information registered as in the above.

Figure 12:
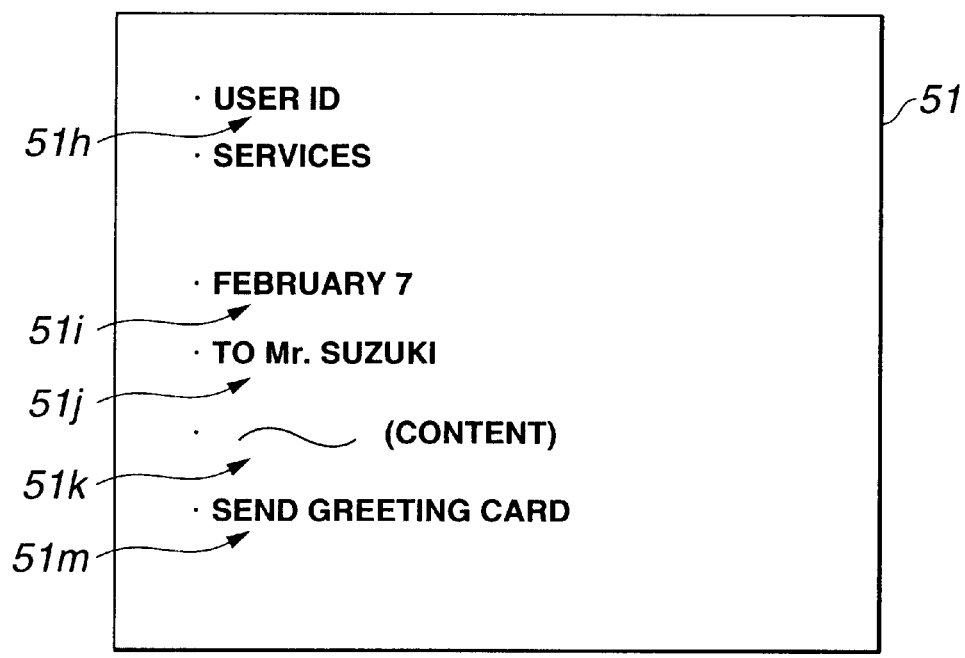
FIG. 12 explains a request for sending a "greeting card".

More specifically, when a request for "Greeting card" service as in FIG. 12 is made to the server 38, a greeting card carrying a birthday greeting message will be sent to Mr. Suzuki on February 7 being the birthday of the robot (e.g., a day on which the robot was put into operation) via e-mail or Web site. Thus, "Mr. Suzuki" (user or the like) will receive the greeting card for congratulation of the robot's birthday.

For example, th greeting card may be "Your robot is three years old on this birthday. Congratulation!" or "Congratulation for entrance to the primary school!".

As in the above, the server 38 provides various services to the users 200 in the network system 30.

Note that the server 38 may hold and manage the content of a service provided to the user 200, as service history information.

The services provided by the server 38 are not limited to the sending of a diagnostic report as in the above. They may include warranty, insurance, etc. of the robot for example. The server 38 collects internal-state information from the robot. The collected internal-state information on a robot can be used for setting such warranty and insurance services for the robot. More specifically, when the internal-state data of the robot indicates that the robot is in good order, a favorable or extended period of warranty should be set for the robot in consideration. Also, the billing should be made to reflect the warranty and insurance services set for the robot. Also, the warranty and insurance services can be set based on the internal-state data such as a diagnostic report.

(4) Example Construction of the Robot (4-1) Hardware Configuration of the Robot

As in FIG. 1, the robot 1 includes a body unit 2 having leg units 3A to 3D joined at the front right and left and rear right and left thereof, and a head unit 4 and tail unit 5 joined at the front and rear ends thereof.

Figure 13:
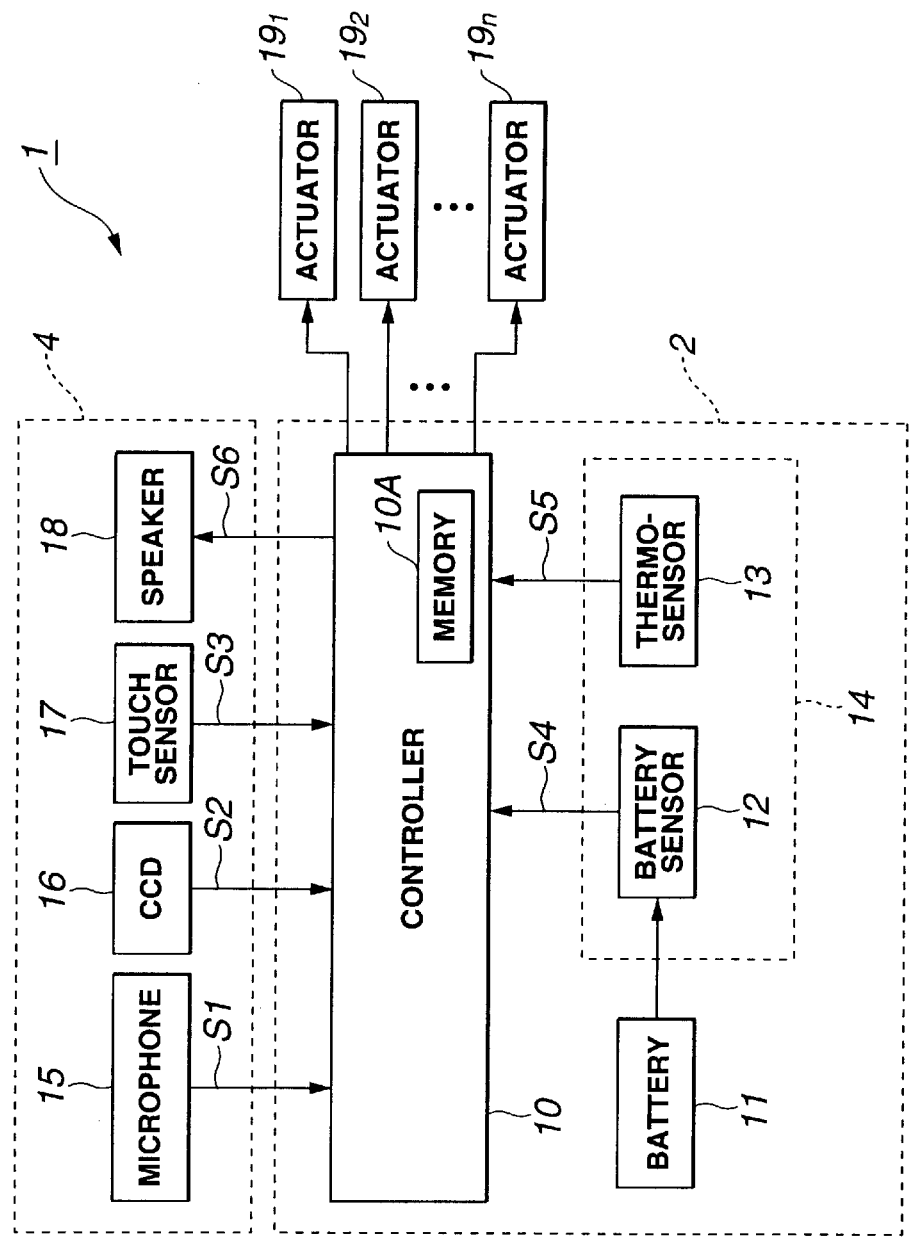
FIG. 13 is a block diagram showing the circuit configuration of the robotic device in FIG. 1.

As shown in FIG. 13, the body unit 2 houses a controller 10 to control the operations of the entire robot 1, a battery 11 to supply a power to the robot 1, an internal sensor unit 14 including a battery sensor 12 and thermo-sensor 13 and others.

The head unit 4 houses a microphone 15 working as "ears" of the robot 2, a CCD (charge coupled device) camera 16 as "eyes", a sensor 17, and a speaker 18 as "mouth", disposed in place, respectively.

Further, actuators $19_1$ to $19_n$ are disposed in joints of the leg units 3A to 3D, articulations between the leg units 3A to 3D and body unit 2, an articulation between the head unit 4 and body unit 2, and in an articulation between the tail unit 5 and body unit 2, respectively.

The microphone 15 in the head unit 4 receives a command sound such as "Walk!", "Be prone!"or "Chase the ball!" given as scales to the robot 1 via a sound commander (not shown) from the user to produce a sound signal S1, and sends the sound signal S1 to the controller 10. Also, the CCD camera 16 captures the environment surrounding the robot 1 to produce an image signal S2, and sends the image signal S2 to the controller 10.

As shown in FIG. 1, the touch sensor 17 is located at the top of the head unit 4. It detects a pressure applied thereto by a physical action of the user such as "patting", "hitting" or the like, and sends the detected pressure as a pressure detection signal S3 to the controller 10.

The battery sensor 12 in the body unit 2 detects the remaining potential in the battery 11, and sends the detected potential as a battery potential detection signal S4 to the controller 10. The thermo-sensor 13 detects the head inside the robot 1 and sends the detected heat as a heat detection signal S5 to the controller 10.

Based on the sound signal S1, image signal S2, pressure detection signal S3, battery potential detection signal S4 and heat detection signal S5 supplied from the microphone 15, CCD camera 16, touch sensor 17, battery sensor 12 and thermo-sensor 13, respectively, the controller 10 judges in what environment the robot 1 stands, and if the user has made any instruction or any action to the robot 1.

The controller 10 decides how to behave or move based on the result of judgment and a control program including a variety of control parameters stored in a memory 10A in advance, and drives, based on the result of decision, an appropriate one of the actuators $19_1$ to $19_n$ to allow the robot 1 to make a behavior or motion by shaking or nodding the head unit 4, wagging a tail 5A of the tail unit 5 or driving each of the leg units 3A to 3D to walk. In the following, a set of behaviors and motions will be referred to as "action".

Also, the controller 10 supplies a predetermined sound signal S6 to the speaker 18 as necessary to provide a sound based on the sound signal S6 to outside and turn on and off an LED (light emitting diode) (not shown) provided at each "eye" position of the robot 1.

Thus, the robot 1 is adapted to autonomously act based on its environment, control program stored in the memory 10A, etc.

(4-2) Software Configuration of the Control Program

Figure 14:
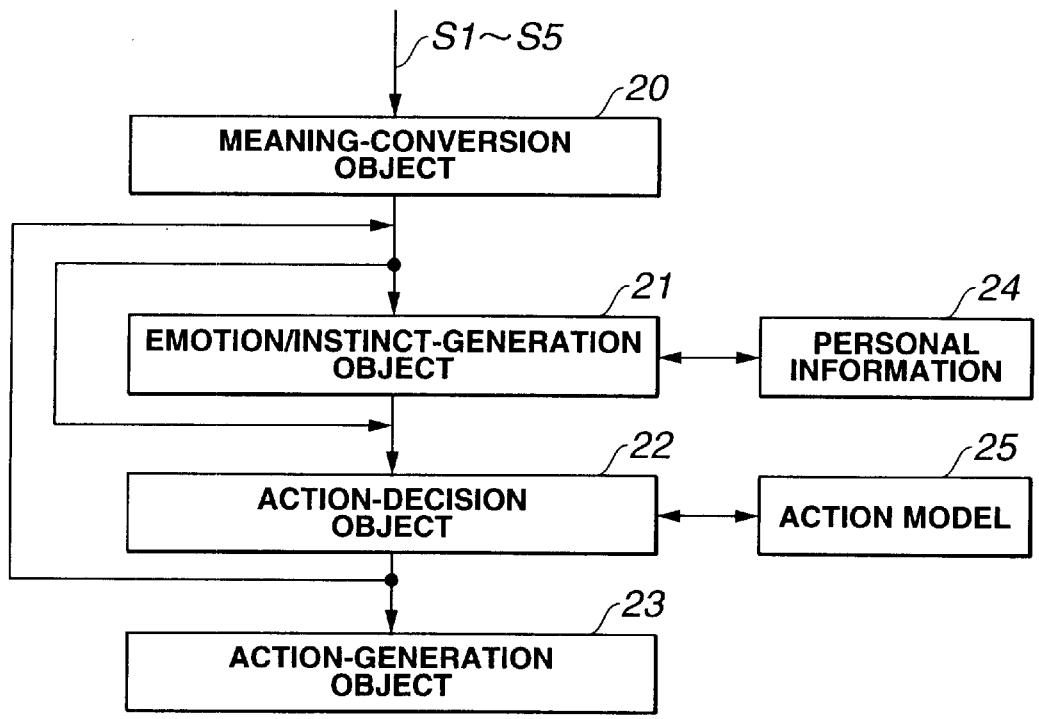
FIG. 14 is a block diagram showing the configuration of a software for the robotic device in FIG. 1.

FIG. 14 shows the software configuration of the above-mentioned control program used in the robot 1. As shown, the control program includes a meaning-conversion object 20, emotion/instinct-generation object 21, action—decision object 22 and an action-generation object 23.

In the above software configuration, the meaning-conversion object 20 recognizes external and internal states of the robot 1. More particularly, the meaning-conversion object 20 recognizes the external and internal stales based on results of detection by various sensors. And, the meaning-conversion object 20 supplies the result of recognition to the emotion/instinct-generation object 21 and action-decision object 22.

The emotion/instinct-generation object 21 consists of an emotion model to change the emotion according to external and internal factors and an instinct model to change the instinct according to the external and internal factors. It generates information intended for the robot 1 to express its emotion or instinct by an action. Specifically, the emotion/instinct-generation object 21 decides the states of emotion and instinct based on the result of recognition supplied from the meaning-conversion object 20 and various other information. And, if the emotion or instinct exceeds a predetermined level, the emotion/instinct-generation object 21 supplies it to the action-decision object 22.

The action-decision object 22 decides an action to be done by the robot 1. More particularly, the action-decision object 22 decides a next due action of the robot 1 based on the result of recognition supplied from the meaning-conversion object 20 and information supplied from the emotion/instinct generation object 21. The action-decision object 22 informs the action-generation object 23 of the result of decision.

The action-generation object 23 controls the robot 1 to actually make a behavior or motion. Namely, the action-generation object 23 controls relevant devices of the robot 1 based on the information (result of decision) supplied from the action-decision object 22 to behave or act as specified by the information.

Thus the control program is composed of the above-mentioned plurality of objects to control the operation of the robot 1. Each of the objects will further be described below.

Based on a sound signal S1, image signal S2, pressure detection signal S3, battery potential detection signal S4 or heat detection signal S5 from the microphone 15, CCD camera 16, touch sensor 17, battery sensor 12 and thermo-sensor 13, respectively, the meaning-conversion object 20 recognizes predetermined external and internal states of the robot 1 such as "the robot 1 has been hit", "the robot 1 has been patted", "the robot 1 has detected the ball", "the battery potential has become lower" or "the internal temperature has been elevated". Then it supplies the result of recognition to the emotion/instinct-generation object 21 and action-decision object 22.

Based on the result of recognition supplied from the meaning-conversion object 20, personal information 24 which is one of the control parameters stored in the memory 10A, and information representing an action having been done and supplied from the action-decision object 22 as will further be described later, the emotion/instinct-generation object 21 decides emotion and instinct levels of the robot 1. When the emotion and instinct levels exceed predetermined ones, the emotion/instinct-generation object 21 supplies the emotion and instinct levels to the action-decision object 22.

More particularly, the emotion/instinct-generation object 21 has an emotion model holding a total of six parameters each representing the strength of emotions including "joy", "sadness", "anger", "surprise", "fear" and "aversion", respectively, and an instinct model holding a total of four parameters representing the strength of desires for "love", "search", "motion" and "eating", respectively.

The memory 10A has also stored therein, as the personal information 24, data such as one of emotion or desire parameters which has to be increased or decreased in value in response to a result of recognition from the meaning-conversion object 20 and information from the action-decision object 22 noticing that an action has been done and which will further be described later and. For example, when the personal information 24 is that the robot 1 has been "hit", the value of the "angry" parameter is increased while that of the "joy" parameter is decreased. When the robot 1 has been "patted", the value of "joy" parameter is increased while that of the "angry" parameter is decreased. When the robot 1 has made an action, the value of the "desire for motion" parameter and that of the "joy" parameter are both increased.

In response to a result of recognition supplied from the meaning-conversion object 20, information supplied from the action-decision object 22, etc., the emotion/instinct-generation object 21 periodically updates the value of an appropriate emotion or desire parameter in the emotion or instinct model on the basis of the personal information.

When as a result of updating of each parameter value, the value of any emotion or desired parameter exceeds a preset value for the emotion or instinct, the emotion/instinct-generation object 21 informs the action-decision object 22 of the fact.

The action-decision object 22 decides a next action based on a result of recognition supplied from the meaning-conversion object 20, information from the emotion/instinct-generation object 21 and an action model 25 which is one of the control parameters stored in the memory 10A, and supplies the action-generation object 23 with the result of decision.

Figure 15:
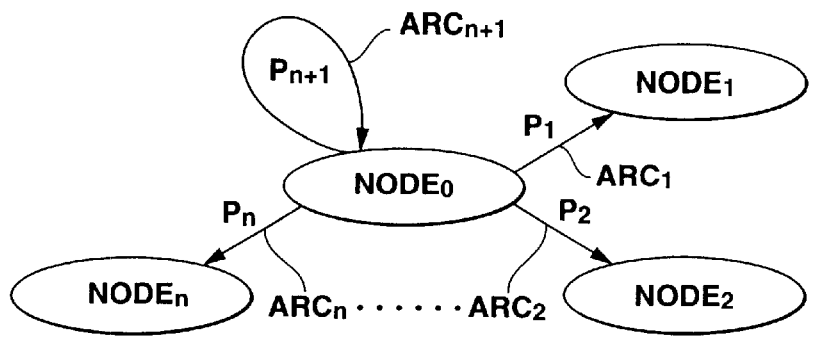
FIG. 15 conceptually shows a probabilistic automaton.

Note that in this embodiment of the present invention, the action-decision object 22 adopts, as a measure for decision of a next action, an algorithm called "probabilistic automaton" to stochastically decide one of nodes $NODE_0$ to $NODE_n$ shown in FIG. 15 to which a transition is to be made from the node $NODE_0$, based on transition probabilities $P_1$ to $P_{n+1}$ set for arcs $ARC_1$ to $ARC_{n+1}$, respectively, which provide connections between the nodes $NODE_0$ to $NODE_n$.

More specifically, the memory 10A has stored therein, as the action model 25, a state transition table 26 as shown in FIG. 16 for each of the nodes $NODE_0$ to $NODE_n$. The action-decision project 22 is adapted to set a next action according to the state transition table 26.

That is, in the state transition table 26, input events (results of recognition) taken as conditions for transition between the nodes $NODE_0$ to $NODE_m$ are entered in an "Input event name" column in the order of precedence, and additional conditional data to the transition conditions are entered in "Data name" and "Data range" columns.

Therefore, as shown in the state transition table 26 in FIG. 16, it is a condition for a node $NODE_{100}$ to transit to another node that when a result of recognition that "BALL (the robot 1 has detected the ball)" is given, "SIZE (ball size)" given together with the result of recognition is "0, 1000 (0 to 1000)". Also, the node $NODE_{100}$ can transit to another node when "OBSTACLE (the robot 1 has detected all obstacle)" is given as a result of recognition and "DISTANCE (distance between the obstacle and robot 1)" given along with the result of recognition is "0, 100 (0 to 100)".

Also, the node $NODE_{100}$ can transit to another node when any of the parameters "JOY", "SURPRISE" and "SADNESS" included in the emotion and desire parameters in the emotion and instinct models in the emotion/instinct-generation object 21 to which the action-decision object 22 refers periodically takes a value of "50, 100 (50 to 100)" even with entry of no result of recognition.

In the state transition table 26, names of the nodes to which each of the nodes $NODE_0$ to $NODE_n$ can transit are given in a "Transition destination nodes" line covered by a "Probability of transition to other node (Di)" column, and probabilities of transition to other nodes $NODE_0$ to $NODE_n$, which would be when all the requirements given in the "Input event name", "Data name" and "Date range" columns, respectively, are satisfied are given in an "Output action" line covered by the "Probability of transition to other node (Di)" column. Note that the sum of the transition probabilities in the line covered by the "Probability of transition to other node Di" column is 100 (%).

Therefore, the node $NODE_{100}$ in the state transition table 26 shown in FIG. 16 can transit to a node $NODE_{120}$ (node 120) with a transition probability of "30%" when "BALL (the bal has been detected)" is given as a result of recognition and "SIZE (the size of the ball)" given along with the result of recognition is "0, 1000 (0 to 1000)". At this time, the robot 1 will make an action "ACTION 1".

The action model 25 is constructed so that many of the nodes $NODE_0$ to $NODE_n$ given in the state transition table 26 are connected to each other. When a result of recognition is supplied from the meaning-conversion object 20 or when a notice is supplied from the emotion/instinct-generation object 21, the action-decision object 22 is adapted to stochastically decide a next action or motion by using the state transition table 26 stored in the memory 10A for appropriate ones of the nodes $NODE_0$ to $NODE_n$ and inform the action-generation object 23 of the result of decision.

The action-generation object 23 drives and controls an appropriate one of the actuators $19_1$ to $19_n$ as necessary based on the information from the action-decision object 22 for the robot 1 to act or move as specified, generates an appropriate sound signal S6 (as shown in FIG. 13) based on a corresponding sound data in a sound data file which is one of the control parameters stored in the memory 10A, and sends it to the speaker 18, or turns on and off the LED at the "eye" position in a corresponding light-emission pattern on the basis of a corresponding light emission data in a light emission data file which is one of the control parameters stored in the memory 10A.

Thus, the robot 1 can make an autonomous action correspondingly to its own state and surrounding environment, and a user's instruction and operation made to the robot 1 on the basis of the control program.

Next, the growth model incorporated in the robot 1 to have the latter act in each of its growth steps will be described.

The growth model is to allow the robot 1 to show an "advanced action" in each higher "growth" step like a real animal on which the robot 1 is modeled.

Namely, the growth model allows the robot 1 to make an action corresponding to each level of growth (degree of growth). More specifically, the robot 1 is designed to act in each of four "growth steps" including "infancy", "boyhood", "adolescence" and "adulthood" according to the growth model.

The growth model includes the above-mentioned action model (action-decision object) for each of the four "growth steps" including "infancy", "boyhood", "adolescence" and "adulthood". A model corresponding to each growth step is selected to have the robot 1 act correspondingly to its step of growth. For example, a difference between two successive ones of the "growth steps" in the growth model is such that an action or motion in a higher growth step is more difficult or complicated than in the precedent growth step.

More specifically, the action model for the "infancy" is such that for example "walking" is "toddling" with short steps and "motions" are "simple" ones such as "toddle", "stand", "lie" and the like. "Action" is a "monotonous" one such as repetition of a motion, and "sound" is a "low and short" one amplified by a low factor.

A transition is made from one to another step of growth by always monitoring and counting occurrence of a plurality of elements (will be referred to as "growth element" hereunder) associated with a predetermined "growth" such as a predetermined action and motion.

More particularly, when a sum of cumulative occurrences of each growth element (will be referred to as "total empirical value of growth element" hereunder) in which the cumulative occurrences (count) of the growth element are taken as information indicative of a growth degree of the growth element, exceeds a preset threshold, another action model is selected for use, that is, a transition is made from for example the "infancy" action model to the "boyhood" one which higher in growth level (difficulty and complexity of action or motion) than the "infancy" action model, thereby allowing a transition to a next growth step.

It should be reminded here that the growth elements include for example input of a command by scale from a sound commander (in a remote controller), input of "padding" and "hitting" from the touch sensor 17, intensified learning including a number of successes in a predetermined action and motion, input of other than "padding" and "hitting" from the touch sensor 17, and a predetermined action and motion such as "playing with a ball".

Then, after transition of the growth step from the "infancy" action model, the action model for the "boyhood" is followed 10 control the actuators $19_1$ to $19_n$ and sound output from the speaker 18 in order to increase the rotation speed of each of the actuators $19_1$ to $19_n$ for a "little more positive" walking, increase the number of "motions" for a "little more advanced and complicate" motion, decide a next "action" with reference to the preceding "action" for an "action with a little more definite intention", and increase the length of "sound" signal and amplify the signal with an increased factor for a "little longer and louder" cry.

Similarly, each time the total empirical value of the growth element exceeds each of thresholds preset for the "adolescence" and "adulthood" after transition through the "boyhood", the action model is sequentially changed to the "adolescence" or "adulthood" higher in "growth step" than the "boyhood" and each of these action models is followed to gradually increase the rotation speed of the actuators $19_1$ to $19_n$ and the length and amplification factor of a sound signal supplied to the speaker 18.

Following the growth model, the robot 1 "toddling" in its "infancy" can "walk more positively" as the "growth step" rises (namely, the action model transits from the "infancy" to the "boyhood", from the "boyhood" to the "adolescence", and from the "adolescence" to "adulthood"), the robot 1 "moving simply" in its "infancy" can "move in a more advanced and complicated manner", and the robot 1 acting "monotonously" in its "infancy" can "act with an intention. Also, the robot 1 can generate a "longer and louder" sound as it grows while it has made a "low and short" sound in its "infancy".

Following the growth model, the robot 1 can make an autonomous action in each of the growth steps correspondingly to its own state and surrounding environment and user's instruction and action made to the robot 1.

The robot management system collects, into the server 38, parameters indicative of states of the emotion, instinct and growth of the robot 1, and generates answer information to a request for diagnosis based on the parameters.

What is claimed is:

1. A robotic device management system comprising:
   a transmitter to send, to a telecommunication line, information on an autonomous type robotic device which acts autonomously according to an external factor and/or internal factor;
   an answer generator to generate answer information based on the robotic device-related information sent from the transmitter via the telecommunication line and reference information previously stored in an information storage means and corresponding to the robotic device-related information and send the answer information to a user of the robotic device via the telecommunication line; and
   a receiver to receive the answer information sent from the answer generator to the robotic device user via the telecommunication line.

2. The system according to claim 1 wherein the robotic device is a one whose growth level is changed according to the external factor and/or internal factor and which acts in a different manner correspondingly to the changed growth level;

the transmitter sends information indicative of the changed growth level of the robotic device as the robotic device-related information; and the answer generator generates information indicative of a growth transition as the answer information on the basis of the robotic device growth level information and the reference information.

3. The system according to claim 1 wherein the robotic device is a one whose character is changed according lo the external factor and/or internal factor and which acts in a different manner correspondingly to the changed character;

the transmitter sends information indicative of the changed character of the robotic device as the robotic device-related information; and the answer generator generates information used to correct the robotic device character as the answer information on the basis of the robotic device character information and the reference information.

4. The system according to claim 1 wherein the transmitter sends information on the states of moving parts of the robotic device; and the answer generator generates information indicative of a diagnosis result as the answer information on the basis of the state information on the moving parts and reference information indicative of information on the normal operating state of the robotic device.

5. The system according to claim 4, wherein the answer generator sends a list of servicemen for repair according to the diagnosis result along with the diagnosis result to the robotic device user via the telecommunication line.

6. The system according to claim 1 wherein the transmitter sends information indicative of a sending date; and the answer generator sends a greeting card to the robotic device user on a predetermined date on the basis of the sending date information.

7. The system according to claim 1 wherein the transmitter sends a plurality of the robotic device-related information; and the answer generator generates the answer information based on the robotic device-related information sent from the transmitter via the telecommunication line and the reference information taken out of the information storage means on the basis of a result of differentiation between the plurality of the robotic device-information.

8. The system according to claim 1, wherein the transmitter automatically generates the robotic device-related information for sending.

9. The system according to claim 1, wherein the transmitter sends information generated by the robotic device user as the robotic device-related information.

10. A robotic device management method comprising steps of:

sending, to a telecommunication line, information on an autonomous type robotic device which acts autonomously according to an external factor and/or internal factor;

preparing answer information based on the robotic device-related information sent in the sending step via the telecommunication line and reference information previously stored in an information storage device and corresponding to the robotic device-related information and sending the answer information to a user of the robotic device via the telecommunication line; and receiving the answer information sent in the answer preparing step to the robotic device user via the telecommunication line.

11. The method according to claim 10 wherein the robotic device is a one whose growth level is changed according lo the external factor and/or internal factor and which acts in a different manner correspondingly to the changed growth level;

in the sending step, there is sent information indicative of the changed growth level of the robotic device as the robotic device-related information; and in the answer generating step, there is generated information indicative of a growth transition as the answer information on the basis of the robotic device growth level information and the reference information.

12. The method according to claim 10 wherein the robotic device is a one whose character is changed according to the external factor and/or internal factor and which acts in a different manner correspondingly to the changed character;

in the sending step, there is sent information indicative of the changed character of the robotic device as the robotic device-related information; and in the answer generating step, there is generated information used to correct the robotic device character as the answer information on the basis of the robotic device character information and the reference information.

13. The method according to claim 10 wherein in the sending step, there is sent information on the states of moving parts of the robotic device; and in the answer generating step, there is generated information indicative of a diagnosis result as the answer information on the basis of the state information on the moving parts and reference information indicative of information on the normal operating state of the robotic device.

14. The method according to claim 13, wherein the answer generating step, there is sent a list of servicemen for repair according to the diagnosis result along with the diagnosis result to the robotic device user via the telecommunication line.

15. The method according to claim 10 wherein in the sending step, there is sent information indicative of a sending date; and in the answer generating step, there is sent a greeting card to the robotic device user on a predetermined date on the basis of the sending date information.

16. An information management apparatus comprising:

means for communicating, via a telecommunication line, with a user of an autonomous type robotic device which acts autonomously according to an external factor and/or internal factor; and means for receiving information on the robotic device via the communicating means, preparing answer information based on the robotic device-related information and reference information previously stored in an information storage means and corresponding to the robotic device-related information, and sending the answer information to the robotic device user via the communicating means.

17. The apparatus according to claim 16 wherein the robotic device is a one whose growth level is changed according to the external factor and/or internal factor and which acts in a different manner correspondingly to the changed growth level; and the answer generator generates information indicative of a growth transition as the answer information on the basis of the robotic device growth level information as the robotic device-related information and the reference information.

18. The apparatus according to claim 16, wherein the robotic device is a one whose character is changed according to the external factor and/or internal factor and which acts in a different manner correspondingly to the changed character; and the answer generator generates information used to correct the robotic device character as the answer information on the basis of the robotic device character information and the reference information.

19. The apparatus according to claim 16, wherein the answer generator generates information indicative of a diagnosis result as the answer information on the basis of the state information on the moving parts of the robotic device as the robotic device-related information and reference information indicative of information on the normal operating state of the robotic device.

20. The system according to claim 19, wherein the answer generator sends a list of servicemen capable of a repair according to the diagnosis result along with the diagnosis result to the robotic device user via the communicating means.

21. The apparatus according to claim 16, wherein the answer generator sends a greeting card to the robotic device user via the communicating means on a predetermined date on the basis of the sending date information sent from the robotic device user via the telecommunication line.

22. The apparatus according to claim 16, wherein the answer generator generates the answer information based on a plurality of the robotic device-related information as the robotic device-related information and the reference information taken out of the information storage means on the basis of a result of differentiation between the plurality of the robotic device-information.

23. A robotic device management method comprising steps of:

sending, by a user of an autonomous type robotic device which acts autonomously according to an external factor and/or internal factor, information on the robotic device, and receiving, by means of an information management apparatus, the robotic device-related information sent from the autonomous type robotic device;

managing the robotic device by the information management apparatus based on the robotic device-related information received in the receiving step; and sending, by means of the information management apparatus, information on the state of the robotic device, generated in the managing step to the robotic device user.

24. The method according to claim 23, further comprising steps of:

making, to the information management apparatus, a request having been made by the robotic device user according to the robotic device state information sent in the sending step; and making measures corresponding to an matter requested in the requesting step and to be effected by the information management apparatus.

* * * * *